US009302893B2

(12) United States Patent
Goncalves et al.

(10) Patent No.: US 9,302,893 B2
(45) Date of Patent: Apr. 5, 2016

(54) VIBRATION CONTROL SYSTEMS AND METHODS FOR INDUSTRIAL LIFT TRUCKS

(71) Applicants: Fernando D. Goncalves, Endicott, NY (US); John Bryant Kirk, Greene, NY (US); Steven J. Medwin, Binghamton, NY (US)

(72) Inventors: Fernando D. Goncalves, Endicott, NY (US); John Bryant Kirk, Greene, NY (US); Steven J. Medwin, Binghamton, NY (US)

(73) Assignee: The Raymond Corporation, Greene, NY (US)

( * ) Notice: Subject to any disclaimer, the term of this patent is extended or adjusted under 35 U.S.C. 154(b) by 454 days.

(21) Appl. No.: 13/761,783

(22) Filed: Feb. 7, 2013

(65) Prior Publication Data

US 2014/0216853 A1 Aug. 7, 2014

(51) Int. Cl.
*G06F 7/70* (2006.01)
*B66F 17/00* (2006.01)

(52) U.S. Cl.
CPC .................................. *B66F 17/003* (2013.01)

(58) Field of Classification Search
CPC .................................................. B66F 17/003
USPC ......... 701/1, 50; 187/222, 226, 230, 233, 237
See application file for complete search history.

(56) References Cited

U.S. PATENT DOCUMENTS

| | | | |
|---|---|---|---|
| 2,982,395 | A | 5/1961 | Rados |
| 3,031,024 | A | 4/1962 | Ulinski |
| 3,067,839 | A | 12/1962 | Gibson |
| 3,504,889 | A | 4/1970 | Wyrough |
| 3,672,634 | A | 6/1972 | Chaffin |
| 3,918,597 | A | 11/1975 | Lee |
| 4,037,739 | A | 7/1977 | Lee |
| 4,509,127 | A | 4/1985 | Yuki et al. |
| 4,530,492 | A | 7/1985 | Bork |
| 5,020,825 | A | 6/1991 | Lizell |
| 5,107,969 | A | 4/1992 | Klein et al. |
| 5,269,501 | A | 12/1993 | Liegel et al. |
| 5,289,902 | A | 3/1994 | Fujita |
| 5,338,015 | A | 8/1994 | Liegel et al. |
| 5,579,859 | A | 12/1996 | Quellhorst et al. |
| 5,628,377 | A | 5/1997 | Le Gloan |
| 5,647,600 | A | 7/1997 | Booras |
| 5,781,873 | A | 7/1998 | Sasaki |
| 5,853,181 | A | 12/1998 | Booras |
| 5,878,851 | A | 3/1999 | Carlson et al. |
| 5,993,358 | A | 11/1999 | Gureghian et al. |

(Continued)

FOREIGN PATENT DOCUMENTS

| | | | |
|---|---|---|---|
| CN | 2889874 | Y | 4/2007 |
| DE | 19957377 | C | 1/1957 |

(Continued)

OTHER PUBLICATIONS

"Active Sway Control cuts picking times down to size." http://www.ethiopianreview.com/articles/120808. Dated Nov. 4, 2010.

(Continued)

*Primary Examiner* — Luke Huynh
(74) *Attorney, Agent, or Firm* — Quarles & Brady LLP

(57) ABSTRACT

A lift truck includes systems and methods for improved vibration control. A corrective yaw input mechanism reduces or eliminates torsional vibration motion of the lift truck about the Z-axis. Some embodiments may include, alone or in combination, drive wheel control and load wheel control.

18 Claims, 7 Drawing Sheets

(56) References Cited

U.S. PATENT DOCUMENTS

| | | | | |
|---|---|---|---|---|
| 6,226,558 | B1 | 5/2001 | Schneider et al. | |
| 6,236,927 | B1 | 5/2001 | Sherman | |
| 6,279,199 | B1 | 8/2001 | Plate | |
| 6,499,184 | B2 | 12/2002 | Plate | |
| 6,517,094 | B1 | 2/2003 | Kincaid | |
| 6,601,825 | B2 | 8/2003 | Bressner et al. | |
| 6,688,631 | B1 | 2/2004 | Andre | |
| 6,847,874 | B2 | 1/2005 | Stiller | |
| 7,008,166 | B1 | 3/2006 | Grimes | |
| 7,017,228 | B2 | 3/2006 | Silverstein et al. | |
| 7,070,028 | B2 | 7/2006 | Reybrouck et al. | |
| 7,073,643 | B2 | 7/2006 | Schel | |
| 7,121,372 | B2 | 10/2006 | Braud | |
| 7,243,904 | B1 | 7/2007 | Grimes | |
| 7,413,062 | B2 | 8/2008 | Vandewal | |
| 7,593,797 | B2 | 9/2009 | Izawa et al. | |
| 7,770,904 | B2 | 8/2010 | Passeri | |
| 7,896,358 | B2 | 3/2011 | Hoff | |
| 7,905,555 | B2 | 3/2011 | Huntimer | |
| 8,140,228 | B2 | 3/2012 | McCabe et al. | |
| 2006/0138733 | A1 | 6/2006 | Clauson | |
| 2006/0182578 | A1 | 8/2006 | Morton | |
| 2006/0231312 | A1 | 10/2006 | Passeri | |
| 2007/0056141 | A1 | 3/2007 | Armano et al. | |
| 2007/0231113 | A1 | 10/2007 | McGurn | |
| 2008/0006494 | A1 | 1/2008 | Vandewal | |
| 2009/0082925 | A1 | 3/2009 | Wijffels et al. | |
| 2009/0166989 | A1 | 7/2009 | Atsushi | |
| 2009/0312875 | A1 | 12/2009 | Lehtonen et al. | |
| 2010/0063682 | A1* | 3/2010 | Akaki | 701/42 |
| 2010/0230913 | A1 | 9/2010 | Peterson | |
| 2011/0243699 | A1 | 10/2011 | Kleeberger et al. | |
| 2012/0101627 | A1 | 4/2012 | Lert | |
| 2013/0116890 | A1* | 5/2013 | Hayama | 701/41 |

FOREIGN PATENT DOCUMENTS

| | | | |
|---|---|---|---|
| DE | 19641192 | | 3/1998 |
| DE | 19641192 | A1 | 3/1998 |
| DE | 102004048519 | | 3/2006 |
| DE | 102005053264 | | 5/2007 |
| DE | 102008020595 | | 10/2009 |
| EP | 0890462 | A1 | 1/1999 |
| EP | 0921095 | A2 | 6/1999 |
| EP | 0931758 | A1 | 7/1999 |
| EP | 1172277 | A2 | 1/2002 |
| EP | 1588979 | | 10/2005 |
| EP | 1588979 | A2 | 10/2005 |
| EP | 1975114 | | 10/2008 |
| EP | 1975114 | A1 | 10/2008 |
| EP | 2022749 | | 2/2009 |
| EP | 2053013 | A2 | 4/2009 |
| EP | 2081822 | | 7/2009 |
| GB | 2379434 | A | 3/2003 |
| JP | 57160708 | | 10/1982 |
| JP | S58167214 | A | 10/1983 |
| JP | 06263145 | | 9/1994 |
| JP | 07315518 | | 12/1995 |
| JP | 09086610 | | 3/1997 |
| JP | 9145552 | | 6/1997 |
| JP | H11 100200 | A | 4/1999 |
| JP | 11301233 | | 11/1999 |
| JP | H11301233 | A | 11/1999 |
| JP | 2000 062428 | A | 2/2000 |
| JP | 2000 238999 | A | 9/2000 |
| JP | 2002370899 | A | 12/2002 |
| JP | 2004001941 | A | 1/2004 |
| JP | 2004269236 | | 9/2004 |
| JP | 2008081261 | | 4/2008 |
| JP | 2008081261 | A | 4/2008 |
| WO | 2008006928 | | 1/2008 |

OTHER PUBLICATIONS

"Sway Control." http://www.hsmsearch.com/stories/articles/-/handling_storing/warehouse_safety/sway_control/. Dated Jun. 1, 2011.

"Rocla's new innovation brings more intelligence into warehouse trucks and improves user comfort." http://www.rocla.com/news.asp?Section=405&Item=5309. Dated 2012.

Zimmert, Nico et al. "Active Damping Control for Bending Oscillations of a Forklift Mast Using Flatness based Techniques." Journal Article. Dated Jun. 2010. American Control Conference. pp. 1538-1543.

Kullaa, Jyrki. "Active Control of a Mast Structure Using Support Excitation. European Congress on Computational Methods in Applied Sciences and Engineering." Dated Jul. 2004. pp. 1-14.

Minav, T.A. et al. "Electric energy recovery system efficiency in a hydraulic forklift." IEEE EUROCON, 2009: pp. 758-765.

Guang-zhao Cui et al. "A robust autonomous mobile forklift pallet recognition." 2nd International Asia Conference on Informatics in Control, Automation and Robotics (CAR). vol. 3, 2010: pp. 28+.

Keum-Shik Hong et al. "Navigation Function-Based Control of Multiple Wheeled Vehicles." IEEE Transactions on Industrial Electronics. vol. 58, Issue 5, 2011: pp. 1896-1906.

Hoefinghoff, J.-F. et al. "Using 3D Field Simulation for Evaluating UHF RFID Systems on Forklift Trucks." IEEE Transactions on Antennas and Propagation. vol. 59, Issue 2, 2011: pp. 689-691.

"Rocla's new innovation brings more intelligence into warehouse trucks and improves user comfort." http://www.rocla.com/news.asp?Section=4058,Item=5309. Dated 2012.

Machine Translated JP 2000-062428 A (Toyota Automatic Loom Works) Feb. 29, 2000.

Machine Translated JP 11-100200 A (Komatsu Forklift) Apr. 12, 1999.

* cited by examiner

VIBRATION CONTROL SYSTEMS AND METHODS FOR INDUSTRIAL LIFT TRUCKS

CROSS-REFERENCE TO RELATED APPLICATIONS

Not applicable.

STATEMENT CONCERNING FEDERALLY SPONSORED RESEARCH OR DEVELOPMENT

Not applicable.

FIELD OF THE INVENTION

The present invention relates to the field of industrial lift trucks, and more specifically to systems and methods for improved vibration control for lift trucks.

BACKGROUND OF THE INVENTION

Lift trucks are designed in a variety of configurations to perform a variety of tasks. One problem with lift trucks is that they can oscillate or vibrate about any of the X-axis, Y-axis and Z-axis (see FIG. 1). For example, when an operator stops the truck abruptly or abruptly changes direction, or both, torsional vibrating motion about the Z-axis (also referred to as yaw) can be felt by the lift truck operator. The vibrations can be more noticeable when the lift truck's mast is vertically extended. While such torsional motion will not tip the truck, the motion can be disconcerting to the operator. Normally an operator will slow down and allow the vibrating motion to naturally dissipate before resuming travel. These unwanted vibrations can reduce the efficiency of the operator and the overall productivity of lift truck operations.

Another problem seen by lift trucks traveling throughout a facility is that they can encounter debris on the floor and uneven floor surfaces. These can take the form of expansion joints, cracks in the floor surface or man-made objects such as ramps going between buildings or into tractor trailers. Tire irregularities and/or the floor can also cause periodic vibrations that can be transmitted throughout the truck's frame.

The vibrations caused by the floor condition can diminish the effectiveness and/or accuracy of sensory equipment on the truck and may necessitate that the truck be operated at slower speeds to reduce the effects of the floor conditions. Slower operating speeds can equate to an undesirable reduction in overall equipment productivity.

Most previously used methods to dissipate vibrations have only attempted to address longitudinal vibrations, and do not address torsional vibrations. Methods that have attempted to address torsional vibrations add unnecessary complexity to the lift truck by decoupling the mast from the carriage. This adds cost and weight, and further areas for mechanical issues.

If the vibrating motion of the truck can be mitigated or even cancelled, the truck would then be capable of traveling faster without the potential damage to components or loss or degradation of truck data, along with a more comfortable ride for the operator.

What is needed is a lift truck configured to improve mitigation of vibrations about the Z-axis, thereby providing a more comfortable ride for the operator and improving productivity.

SUMMARY OF THE INVENTION

Embodiments of the present invention overcome the drawbacks of previous methods by providing systems and methods for improving the vibration control of a lift truck by providing additional stability control features to reduce or eliminate vibrating motion of the truck about the Z-axis. Embodiments of the present invention induce a counter moment to effectively cancel or damp the torsional vibrations, particularly in lift trucks having tall masts and in lift trucks that can provide right angle stacking, for example. The counter moment systems and methods can provide smoother ride characteristics and facilitate improved load handling by providing a more stable ride for the operator.

In one aspect, the present invention provides a system for mitigating torsional vibrations about a Z-axis of a lift truck. The system comprises a tractor unit, with a mast mounted relative to the tractor unit, the mast including a fixed base and a vertically extendable mast section. A vertically movable platform can be attached to the extendable mast section, the platform being vertically movable with the extendable mast section between an upper position and a lower position. A first sensor can be positioned at or near a top of the mast, the first sensor to measure yaw about the Z-axis at or near the top of the mast. A corrective yaw input mechanism can induce a counter moment at or near the fixed base when the measured yaw about the Z-axis at or near the top of the mast exceeds a predetermined value, the induced counter moment used to damp the measured yaw about the Z-axis at or near the top of the mast.

In another aspect, the present invention provides a method for mitigating torsional vibrations about a Z-axis of a lift truck, the lift truck including a mast. The method comprises steps including measuring yaw about the Z-axis at or near a top of the mast; and inducing a counter moment at or near a mast fixed base with a corrective yaw input mechanism when the measured yaw about the Z-axis at or near the top of the mast exceeds a predetermined value, the counter moment used to damp the measured yaw about the Z-axis at or near the top of the mast.

In yet another aspect, the present invention provides a method for mitigating torsional vibrations about a Z-axis of a lift truck. The method comprises steps including monitoring at least one of operator inputs and lift truck parameters; determining if a steering angle is substantially constant; measuring torsional vibrations about the Z-axis in the lift truck; determining if the measured torsional vibrations are at or over a predefined limit; and instructing a corrective yaw input mechanism to generate a corrective yaw input at or near a base of the lift truck, the corrective yaw input for reducing the measured torsional vibrations.

The foregoing and other objects and advantages of the invention will appear in the detailed description which follows. In the description, reference is made to the accompanying drawings which illustrate preferred embodiments.

The invention may be embodied in several forms without departing from its spirit or essential characteristics. The scope of the invention is defined in the appended claims, rather than in the specific description preceding them. All embodiments that fall within the meaning and range of equivalency of the claims are therefore intended to be embraced by the claims.

DETAILED DESCRIPTION OF THE PREFERRED EMBODIMENT

The various aspects of the invention will be described in connection with improved vibration control of industrial lift trucks. That is because the features and advantages that arise due to embodiments of the invention are well suited to this purpose. Still, it should be appreciated that the various aspects of the invention can be applied to achieve other objectives as well.

While the description of embodiments of the invention and the accompanying drawings generally refer to a man-up orderpicker style lift truck, it is to be appreciated that embodiments of the invention can be applied to control unwanted torsional vibrations in any lift truck configuration. Other vehicles that can benefit from embodiments of the invention include a reach truck, a high-lift truck, a counterbalanced truck, and a swing-reach truck, as non-limiting examples.

Figure 1:
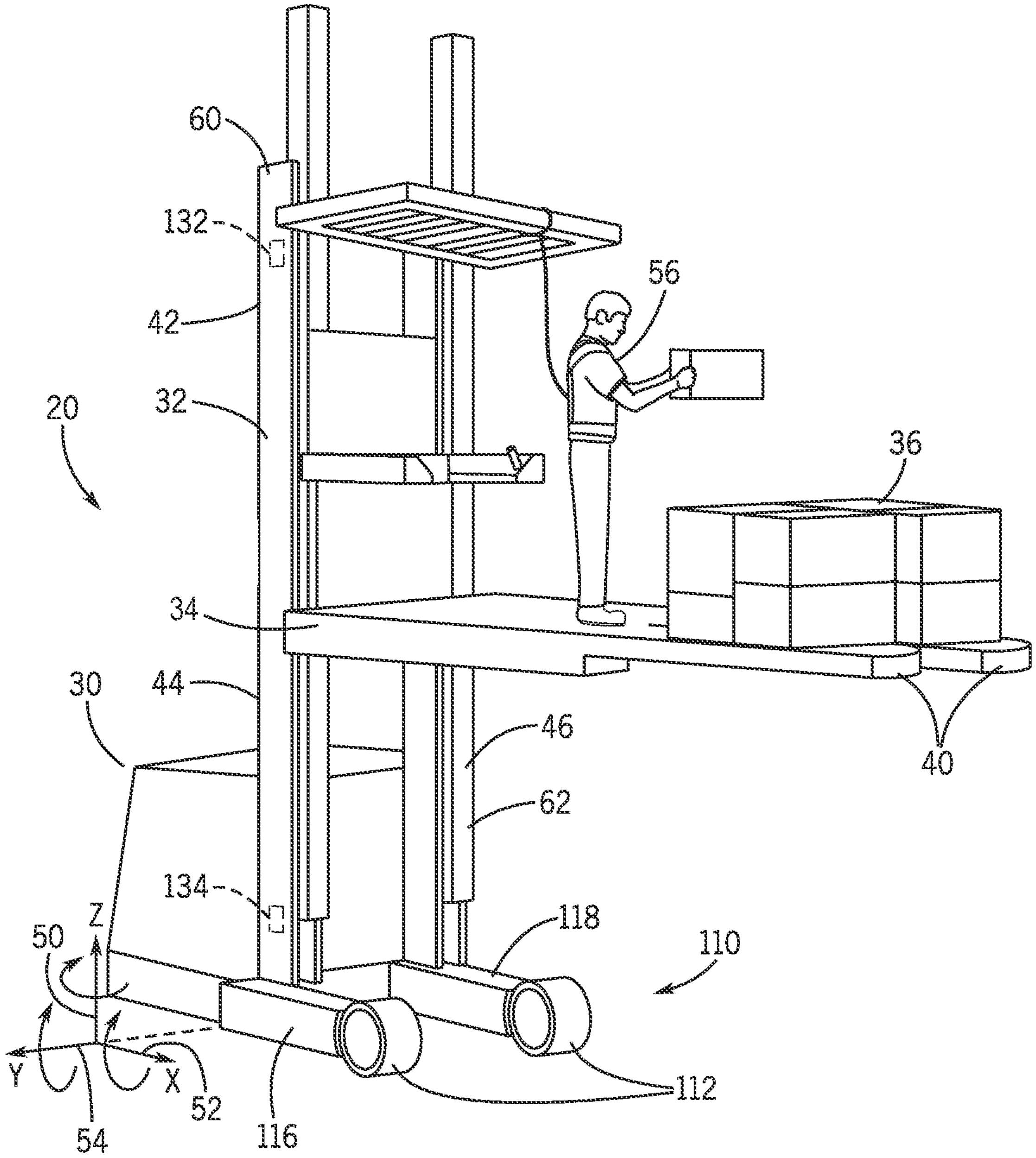
FIG. 1 is a perspective view of a lift truck showing three axes of possible vibrating motion.

Referring to FIG. 1, a lift truck 20 can comprise a tractor unit 30 coupled to a mast 32. The mast 32 can be vertically extendable and can include an operator carriage 34 and/or a platform that can include forks 40 and that can be vertically moveable along the mast 32 to raise and lower a load 36 between an upper position 42 and a lower position 44. The mast 32 can be coupled to a base frame 46 of the truck 20. FIG. 1 illustrates an exemplary man-up orderpicker style lift truck 20 and identifies the coordinate axes. Torsional, or yaw vibrations can occur about the Z-axis 50. Torsional vibrations can cause operator anxiety and lead to reduced productivity. Furthermore, in some cases, the carriage 34 and/or forks 40 of the lift truck 20 can contact a rack (not shown) when vibrating torsionally. Roll can occur about the X-axis 52, and pitch can occur about the Y-axis 54, each of which can be felt by the operator 56 creating a sense of discomfort.

The source of the torsional vibrations can be floor irregularities, operator steering inputs, and/or operator movement between the carriage 34 and a mezzanine or rack, for example. Embodiments of the invention can measure and/or compare either the yaw or the yaw rate at or near the top of the mast 60 to the yaw or yaw rate at or near the base of the mast 62, or anywhere in between. Embodiments of the invention can address the measured torsional vibrations by imposing a counter moment, such as at or near the base of the mast 62, by introducing a corrective counter yaw input. Because the relative stiffness of the mast 32 is finite in all axes, the yaw at or near the top of the mast 60, for example at the carriage 34 when in a raised position 42, is not necessarily equal to the yaw at the tractor unit 30. The difference between the two yaw measurements can be a function of several parameters and operating conditions, including mast height, mast stiffness and the load 36 on the forks 40. When the carriage 34 begins to vibrate torsionally, the relative yaw or yaw rate between the top of the mast 60 and the tractor unit 30 can be measured and an appropriate corrective counter yaw input can be applied to the lift truck 20 through a corrective yaw input mechanism. The corrective yaw input mechanism can introduce yaw corrections at or near the truck frame 46 and/or the base of the mast that can induce a counter yaw moment to effectively cancel or damp torsional vibrations at or near the top of the mast 60 and along the mast 32. The construction can vary according to corrective yaw input mechanism.

Figure 2:
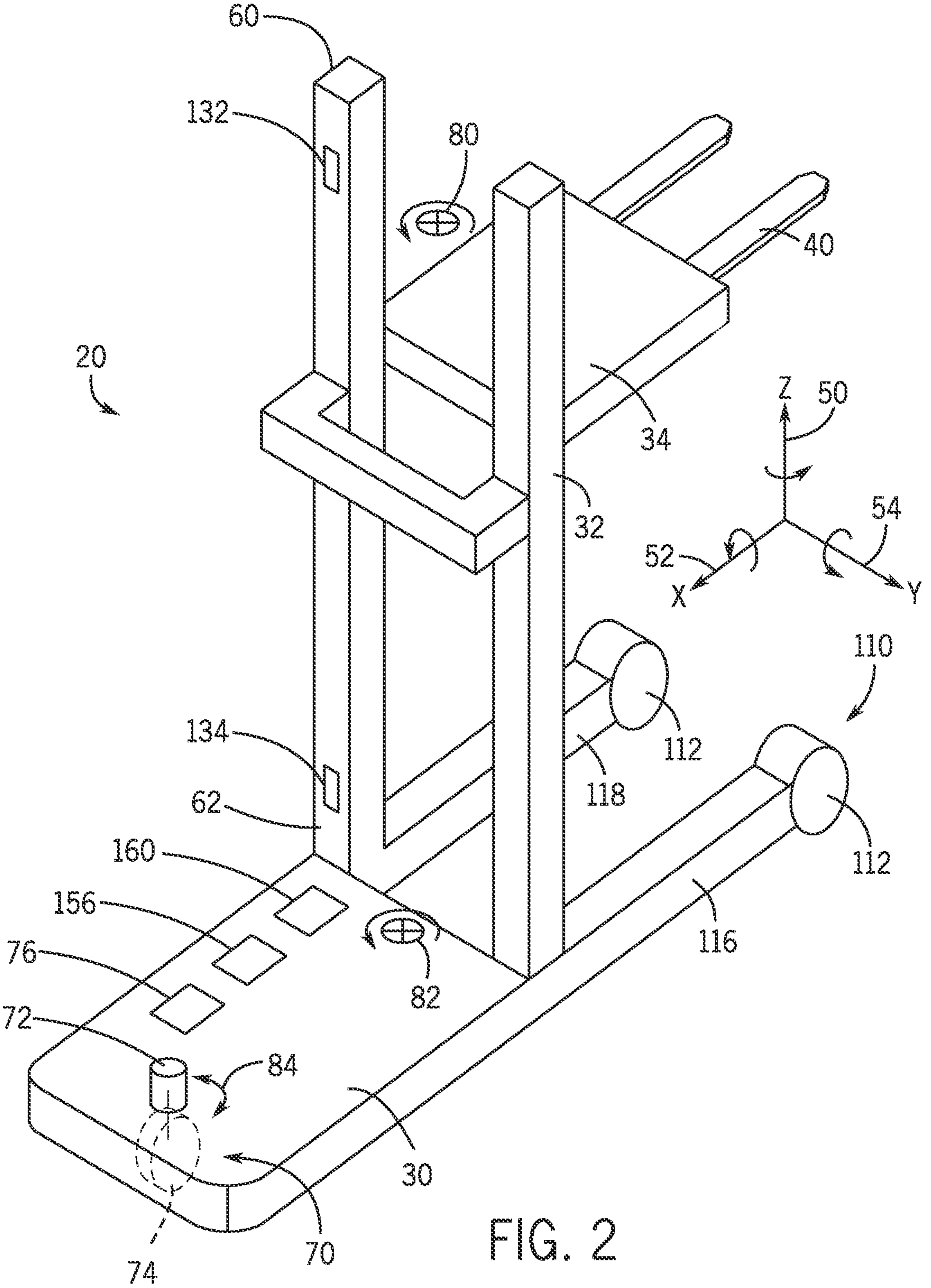
FIG. 2 is a simplistic view of a lift truck, and showing one embodiment of a corrective yaw input mechanism.

Referring to FIG. 2, in one embodiment, a corrective yaw input mechanism 70 can include a motor 72 and/or a traction wheel 74 (also known as steering wheel). In this embodiment, if a counter yaw moment can be used to cancel torsional vibrations at or near the top of the mast 60, a controller 76 can command a steering input to the motor 72 to turn the traction wheel 74 that can in-turn create a counter yaw moment at or near the base of the mast 62. Referring to FIG. 2, to minimize carriage 34 torsional rotations about point 80, a counter rotation at or near point 82 can be induced by introducing an input to steering angle 84 without input from a lift truck operator. A minor steering input can induce counter moments at 82 that effectively damp torsional vibrations at 80.

Figure 3:
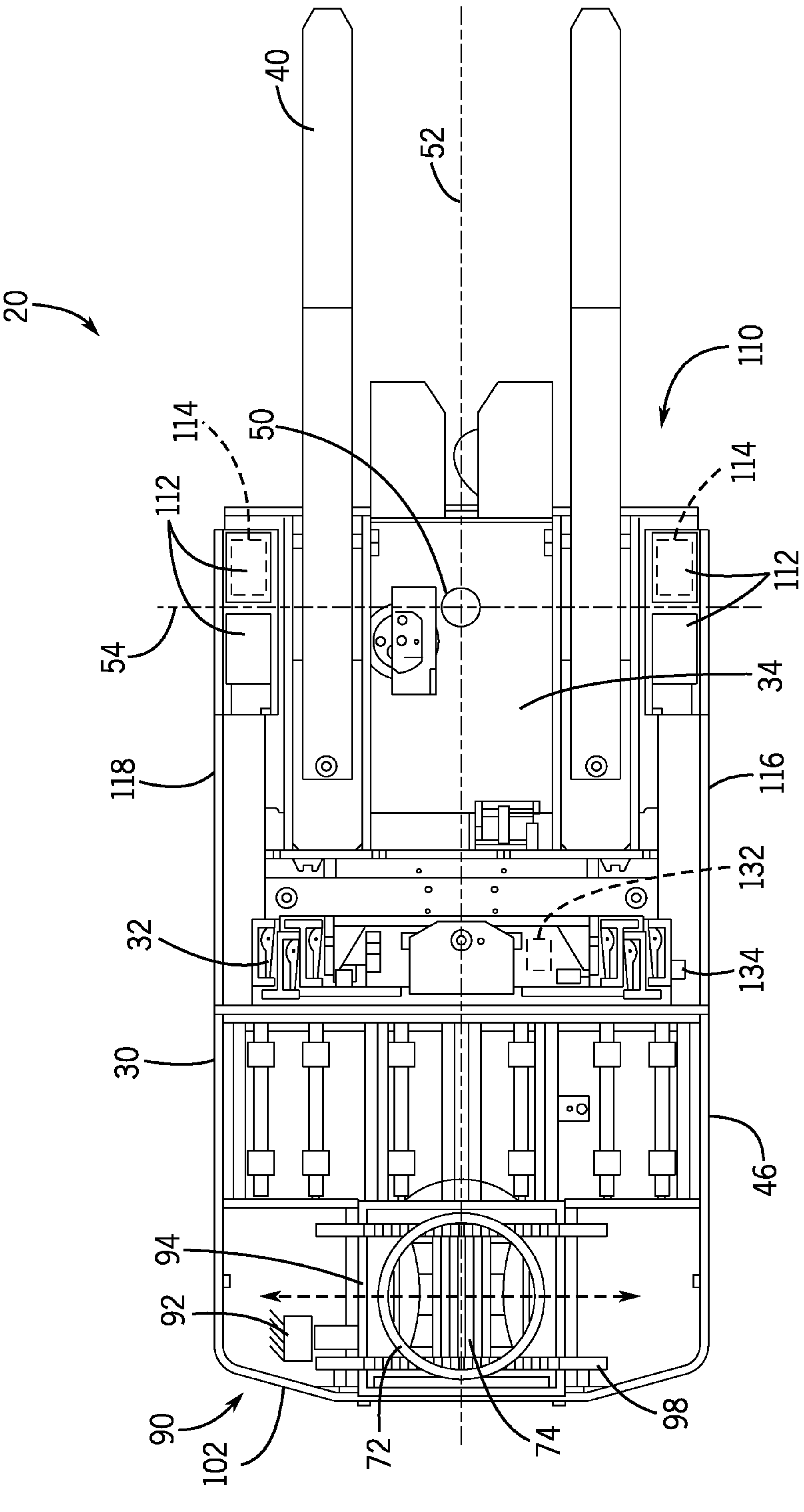
FIGS. 3 and 4 are bottom views of a lift truck similar to the truck of FIG. 1, and showing another embodiment of a corrective yaw input mechanism.
Figure 4:
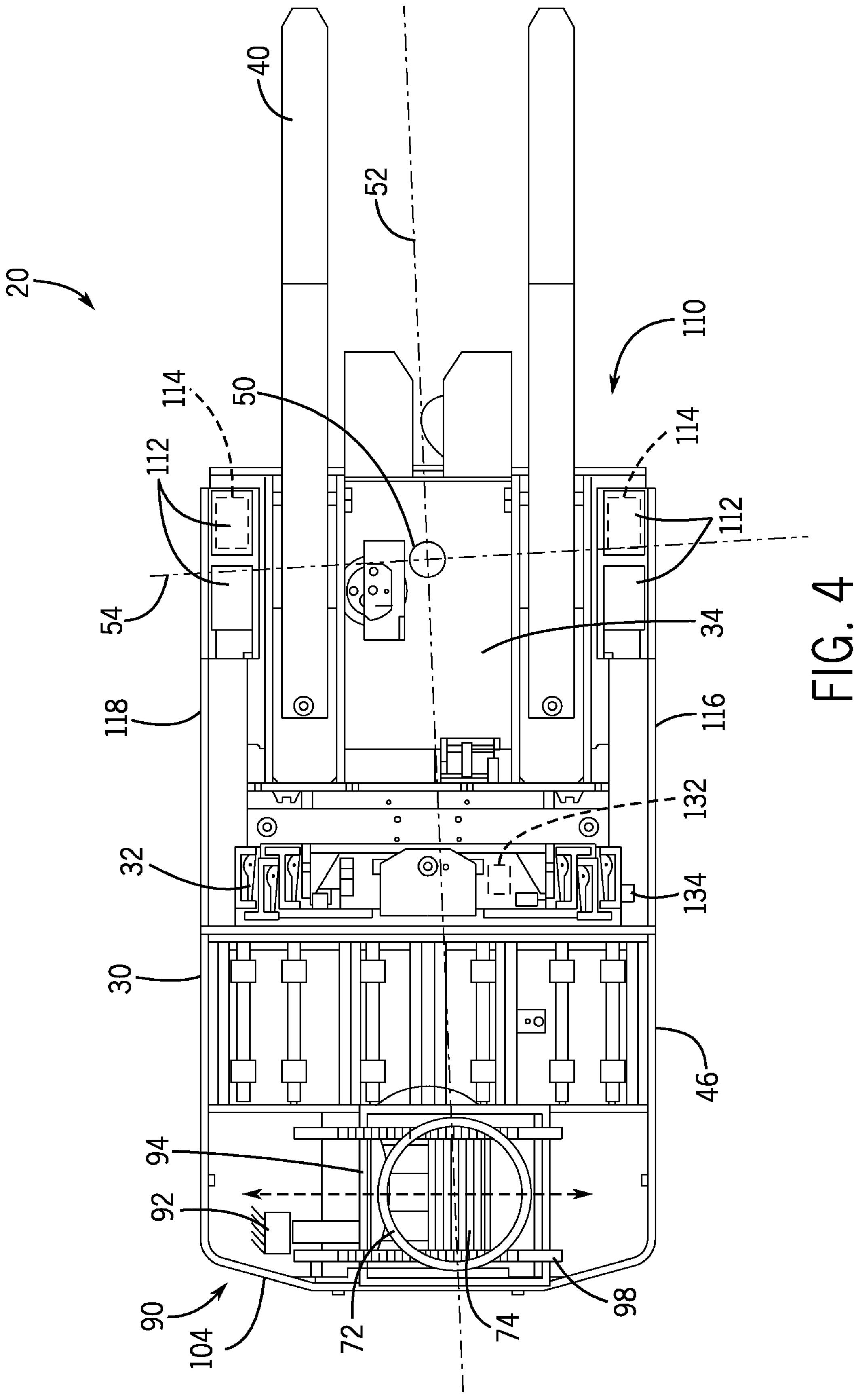

Referring to FIG. 3, in another embodiment, a corrective yaw input mechanism 90 can be an actuator 92, such as a linear actuator. In some embodiments, the actuator 92 can be installed near the motor 72 and/or traction wheel 74 and can act against a laterally moveable truck frame 46. The actuator 92 can be installed between a motor carriage 94 and the truck frame 46, and can generate relative movement between the motor carriage 94 and the truck frame 46. With the traction wheel 74 coupled to the motor 72 and motor carriage 94, the motor carriage 94 can ride on linear bearings 98, for example, and can allow relative movement between the traction wheel 74 and the tractor unit 30. When the actuator 92 is extended from a first position 96 to an extended position 100, the truck frame 46 can move from a first truck frame position 102 (see FIG. 3) to a second truck frame position 104 (see FIG. 4). In this embodiment, the motor carriage 94 may not move relative to the ground. The weight of the truck 20 is on the traction wheel 74, which is coupled to the motor carriage 94, so when the actuator 92 is extended and/or retracted, the lift truck 20 can be caused to pivot about the Z-axis 50, creating a yaw or torsional moment that can be used to damp torsional vibrations at or near the top of the mast 60 and along the mast 32.

In some embodiments, a variety of actuators 92 are contemplated for use with the invention. For example, small hydraulic cylinders with a rapid response profile are available. Other suitable actuators would be known to one of skill in the art.

Figure 5:
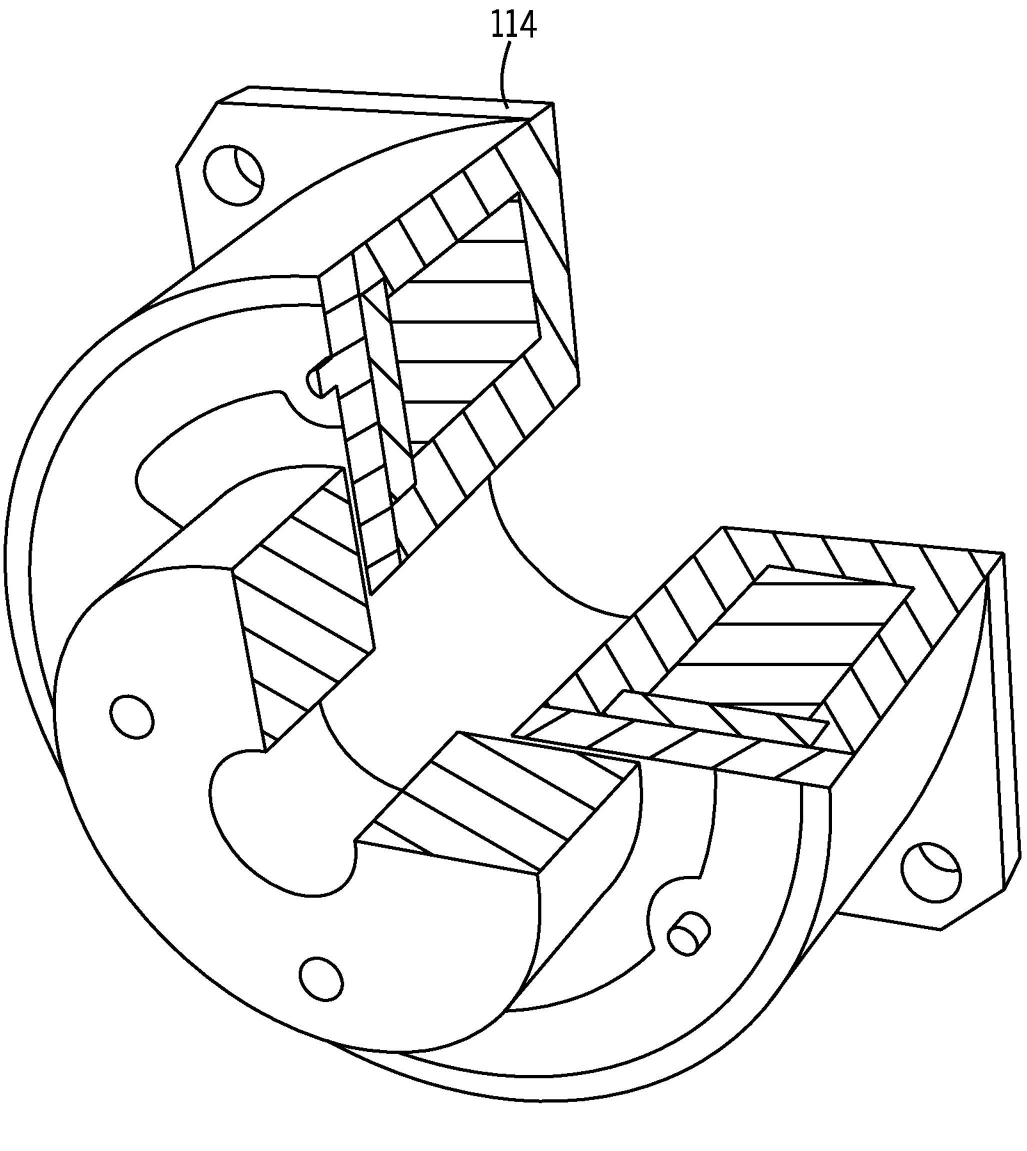
FIG. 5 is a perspective view of a brake usable with embodiments of the invention.

Referring to FIGS. 1 through 5, in yet another embodiment, a corrective yaw input mechanism 110 can be one or more load wheels 112 with a brake 114 installed. The braking force can be actuated electrically, mechanically, and/or pneumatically, for example, and can create brief controlled forces by slowing one or more of the load wheels 112. For example, one load wheel 112 in both the right load leg 116 and the left load leg 118 can have a brake 114. By pulsing one, and/or then the other, a counter yaw moment can be created to counteract a torsional vibration of the carriage 34. FIG. 5 shows an example of a brake 114 that can be integrated into a load wheel 112 to provide a force to create a desired counter yaw moment.

In use, if while traveling at an elevated height, for example, the carriage 34 begins to vibrate torsionally, the controller 76 can implement a corrective yaw control algorithm 130 that can command at least one of or combinations of the corrective yaw input mechanisms 70, 90, 110 to induce at least one counter moment of appropriate magnitude to damp or cancel the torsional vibrations. The torsional vibrations at or near the top of the mast 60 and at or near the base of the mast 62 can be monitored by at least one yaw or yaw rate sensor 132 and 134 respectively. In some embodiments, a sensor 132 can be positioned at or near the top of the mast 60, and another sensor 134 can be placed at or near the base of the mast 62. Each sensor 132 and 134 can provide movement feedback to the controller 76.

In some embodiments, a variety of different sensors are contemplated for use with embodiments of the invention. For example, a variety of gyroscope configurations are available, such as a solid state Micro-electromechanical Systems (MEMS) gyroscope. There are also several other types of gyroscope sensors or combinations of sensors that can replace a true gyroscope. In other embodiments, the torsional vibrations of the lift truck could be sensed by differential accelerometers, such as two Z-axis accelerometers with one mounted at or near the top of the mast 60 and one at or near the base of the mast 62. For vibrations about the Z-axis 50, the difference between the Z-axis acceleration at the top and bottom can indicate a vibration is happening. Also, torsional vibrations can be measured by mechanical devices used as sensors. For example, compression or expansion of springs at or near the top of the mast 60 and at or near the base of the mast 62 could be measured by any type of proximity sensor.

Figure 6:
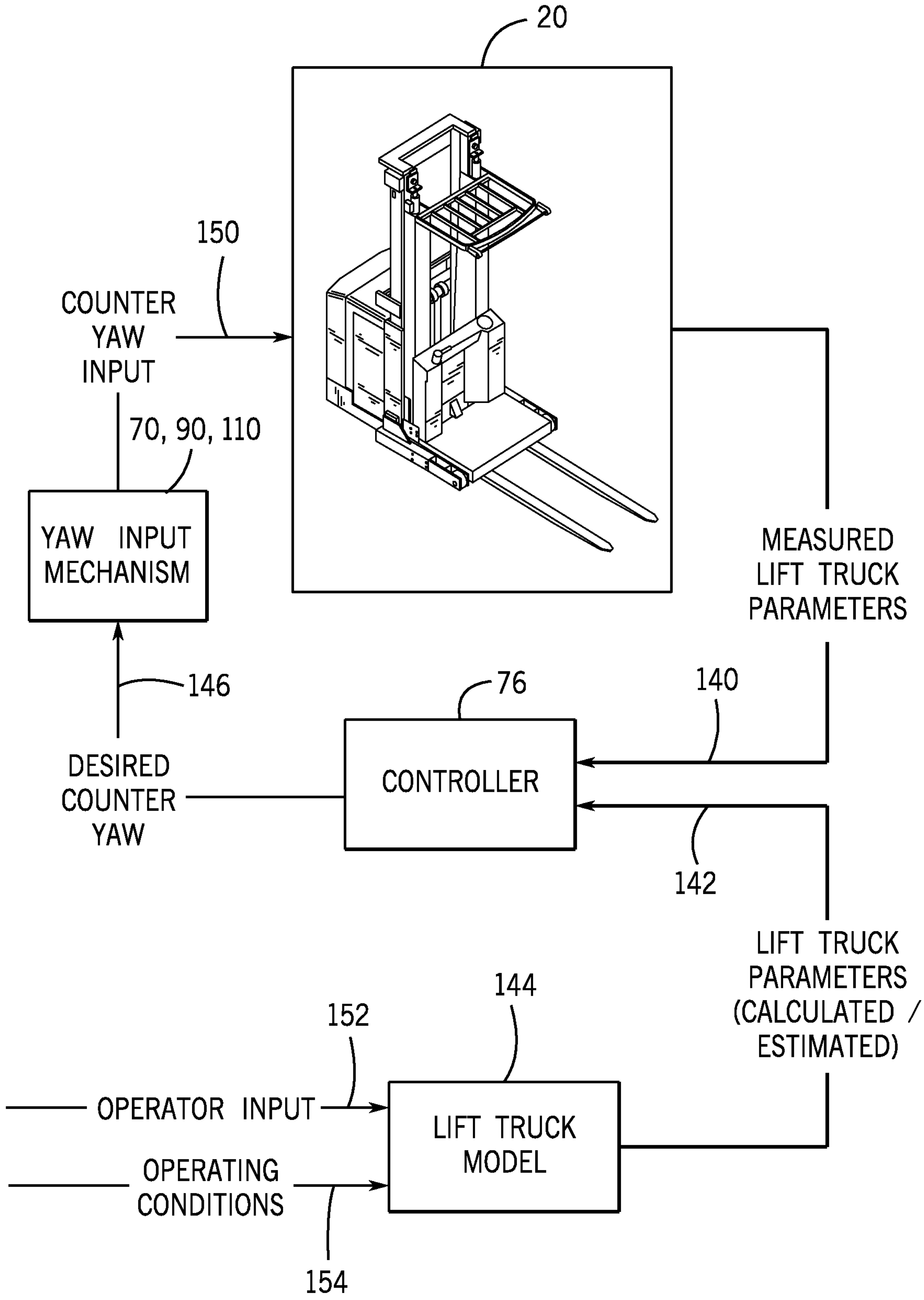
FIG. 6 is a schematic drawing of a system for controlling torsional vibrations of a lift truck about the Z-axis according to embodiments of the invention.
Figure 7:
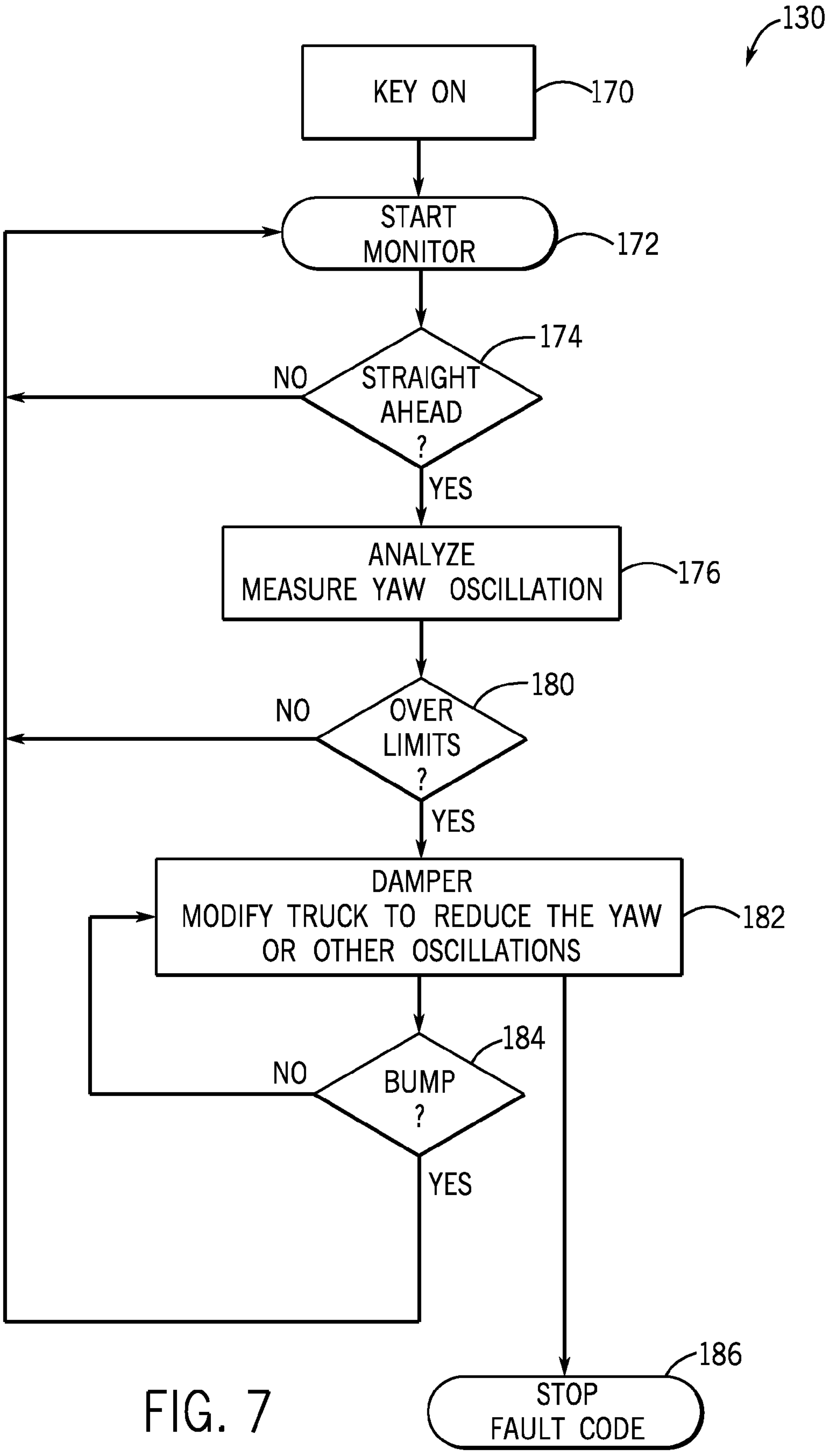
FIG. 7 is a flow chart of an algorithm according to embodiments of the invention, the algorithm adapted for controlling torsional vibrations of a lift truck about the Z-axis according to embodiments of the invention.

Referring to FIGS. 6 and 7, the controller 76 can receive one or both measured lift truck parameters 140 and calculated or estimated lift truck parameters 142 as inputs from the lift truck 20 and/or a lift truck model 144. The lift truck model 144 can be tunable and can also be self-monitoring so that the lift truck model 144 can calibrate itself based on measured lift truck performance. Such self-calibrations can be used to account for changes in system dynamics due to wear, for example. The output of the controller 76 can be a desired counter yaw 146 that can command a corrective yaw input mechanism 70, 90, 110 to create a counter yaw input 150 to the lift truck 20.

In some embodiments, the time required to move through the corrective yaw control algorithm 130 can be extremely short. The controller 76 on board the lift truck 20 can run through the corrective yaw control algorithm 130 many times a second, for example. In this way, an operator input 152 such as a change in speed or steering can change the lift truck motion and seconds later, or less, the counter yaw input 150 can be back to reducing the undesirable torsional motion.

Referring to FIG. 7, one embodiment of a method is shown for reducing the undesirable torsional motion. It is to be appreciated that the systems and methods are adaptable for one or more of the resultant forces in any of the three axes to control, for example, yaw 50, roll 52 and pitch 54 together or individually, and can use feedback of any of the factors described above, or other factors that would be known to one of skill in the art.

The corrective yaw control algorithm 130 can start with an initialization process indicated as KEY ON at process block 170. At KEY ON, the algorithm 130 can initialize counters and check sensors, for example. Next, at process block 172, operator inputs 152 and/or lift truck parameters 140 can be monitored. For example, in some embodiments, when the operator 56 touches a brake pedal or accelerator (neither shown), a speed control 156 can be shut down. The corrective yaw control algorithm 130 can at decision block 174 determine if the steering angle, for example, is close to constant and the operator 56 is making only small operator inputs 152. For example, the operator 56 has stopped trying to adjust steering, or wire guidance is ON and the wire guidance system 160 has stopped making large changes in steering angle. If operator inputs 152 and/or lift truck parameters 140 are still changing, the corrective yaw control algorithm 130 can continue to monitor the operator inputs 152 and/or lift truck parameters 140 at process block 172.

At process block 176, the corrective yaw control algorithm 130 can analyze the lift truck 20 motion to measure, for example, any of amplitude, frequency, phase and decay rate of several torsional vibrations using at least one of the sensors 132, 134. The corrective yaw control algorithm 130 can determine if the torsional vibrations are increasing or decreasing. Note that this analysis may be running as a subroutine in the background. This analysis of the lift truck motion can be revised when the lift truck 20 is traveling in a straight line for some time period. This is because the use of steering to induce counter yaw moments can be more effective when the truck 20 has been traveling in a straight line for some time period, e.g., when wire guidance is being used. Revising the analysis can be used to prevent the corrective yaw control algorithm 130 from attempting to modify an operator intended steering input. At decision block 180, the corrective yaw control algorithm 130 can determine if the amplitude, for example, of a vibration, yaw for example, is large enough, e.g., over a predefined limit, or is increasing instead of decaying. If not, the corrective yaw control algorithm 130 can continue to monitor the operator inputs 152 and/or lift truck parameters 140 at process block 172. If the torsional vibration is over a predefined limit, or is increasing instead of decaying, then at process block 182, the corrective yaw control algorithm 130 can instruct any or all of the corrective yaw input mechanisms 70, 90, 110 to generate a counter yaw input 150 to reduce or eliminate the torsional motion the operator can feel. In some embodiments, the corrective yaw control algorithm 130 can continue to generate a counter yaw input 150 until an operator input 152 and or operating characteristics 154 affect the corrective yaw control algorithm 130, such as at decision block 184. Or, if the measured lift truck parameters 140 does not respond to the counter yaw input 150, the corrective yaw control algorithm 130 can STOP at process block 186 and can set a fault code, for example.

In some embodiments, control of torsional vibrations can also be managed using modifications of acceleration and velocity, such as can be done with software that optimizes truck speed at elevations over a full range of heights and load weight conditions, such as the IntelliSpeed system by Raymond Corporation of Greene, N.Y., which can limit lift truck 20 speed at a predefined height. If the operator 56 commands a steering input that the lift truck model 144 predicts would tend to initiate a torsional vibration, the controller 76 can augment the lift truck acceleration and/or velocity so as to minimize any undesirable torsional response. In this way, the controller 76 can also be acting to prevent torsional vibrations before they occur.

In some embodiments, the torsional control strategy can also be applied in conditions where the operator 56 is commanding a steady-state steering input. If, during such an event, the sensors 132, 134 detect an undesirable relative torsional vibration between the carriage 34 and the tractor unit 30, the controller 76 can augment the steering input to induce a counter yaw input 150 to damp or cancel the relative torsional vibration. The corrective counter yaw input 150 to the steering can be small in magnitude such that it may not alter the intended path of the lift truck 20.

As described above, embodiments of the invention create a counter yaw moment at the lift truck level to induce counter moments at or near the base of the mast 62 that can damp or cancel torsional vibrations at or near the top of the mast 60. It is to be appreciated that there can be other ways of achieving this counter yaw moment that have not been described here but should still be considered within the scope of the invention. For example, one such alternate can be for lift trucks that have a moveable mast, in such lift trucks, the hydraulic actuators that are used to move the mast can be used to induce a counter yaw input by commanding the actuators independently of one another in such a way that a counter moment is created. The same is true for lift trucks that have a tiltable mast. The tilt actuators can be used to induce counter yaw moments.

Embodiments according to the invention provide several benefits and advantages that cannot be obtained in existing truck configurations. For example, embodiments of the invention enable a lift truck 20 to stay generally level instead of rocking due to uneven floors. This can be beneficial to the operator standing on the lift truck because a vibrating lift truck can increase operator fatigue. In lifting loads onto or off of high racks or stacks, embodiments of the invention can lock one or more load wheels and/or both the left and right casters to make the mast more stable and stay vertical. Notably, the invention detects and stops the torsional vibrations while other known lift truck stabilization designs do not detect and stop torsional vibrations.

The foregoing has been a detailed description of illustrative embodiments of the invention. Various modifications and additions can be made without departing from the spirit and scope thereof. Furthermore, since numerous modifications and changes will readily occur to those skilled in the art, it is not desired to limit the invention to the exact construction and operation shown and described. For example, any of the various features described herein can be combined with some or all of the other features described herein according to alternate embodiments. While the preferred embodiment has been described, the details may be changed without departing from the invention, which is defined by the claims.

Finally, it is expressly contemplated that any of the processes or steps described herein may be combined, eliminated, or reordered. In other embodiments, instructions may reside in computer readable medium wherein those instructions are executed by a processor to perform one or more of processes or steps described herein. As such, it is expressly contemplated that any of the processes or steps described herein can be implemented as hardware, software, including program instructions executing on a computer, or a combination of hardware and software. Accordingly, this description is meant to be taken only by way of example, and not to otherwise limit the scope of this invention.

We claim:

1. A system for mitigating torsional vibrations about a Z-axis of a lift truck, the system comprising:

a tractor unit;

a mast mounted relative to the tractor unit, the mast including a fixed base and a vertically extendable mast section;

a vertically movable platform attached to the extendable mast section, the platform being vertically movable with the extendable mast section between an upper position and a lower position;

a first sensor at or near a top of the mast, the first sensor to measure yaw about the Z-axis at or near the top of the mast;

a corrective yaw input mechanism, the corrective yaw input mechanism to induce a counter moment at or near the fixed base when the measured yaw about the Z-axis at or near the top of the mast exceeds a predetermined value, the induced counter moment to damp the measured yaw about the Z-axis at or near the top of the mast.

2. The system according to claim 1:

further including a second sensor at or near the fixed base, the second sensor to measure yaw about the Z-axis at or near the fixed base.

3. The system according to claim 2:

further including a controller to compare the measured yaw about the Z-axis at or near the top of the mast to the measured yaw about the Z-axis at or near the fixed base.

4. The system according to claim 1:

further including a controller to control the corrective yaw input mechanism, the controller to instruct the corrective yaw input mechanism as to the magnitude of the induced counter moment.

5. The system according to claim 4:

wherein the first sensor at or near a top of the mast measures a yaw rate about the Z-axis at or near the top of the mast.

6. The system according to claim 5:

wherein the second sensor at or near the fixed base measures a yaw rate about the Z-axis at or near the fixed base.

7. The system according to claim 6:

wherein the controller compares the measured yaw rate about the Z-axis at or near the top of the mast to the measured yaw rate about the Z-axis at or near the fixed base.

8. The system according to claim 1:

wherein the first sensor at or near the top of the mast measures the yaw about the Z-axis at or near the top of the mast when the vertically movable platform is in the upper position.

9. The system according to claim 4:

wherein the corrective yaw input mechanism comprises a steering wheel, the steering wheel to receive a steering input from the controller to adjust a steering angle without input from a lift truck operator, the steering input from the controller to induce the counter moment to damp the measured yaw about the Z-axis at or near the top of the mast.

10. The system according to claim 1:

wherein the corrective yaw input mechanism comprises an actuator coupled to a motor carriage, the actuator being extendable from a first position to an extended position, the actuator to extend a tractor frame from a first tractor frame position to a second tractor frame position, thereby to create a yaw moment to damp torsional vibrations at or near the top of the mast.

11. The system according to claim 1:

wherein the corrective yaw input mechanism comprises a load wheel including a brake, the brake being applied to create a yaw moment to damp torsional vibrations at or near the top of the mast.

12. The system according to claim 1:

wherein the tractor unit includes a right load leg and a left load leg, the right load leg including a right load wheel including a right brake, the left load leg including a left load wheel including a left brake; and a controller to pulse one of the right brake and the left brake, and then the other of the right brake and left brake to create the yaw moment to damp torsional vibrations at or near the top of the mast.

13. A method for mitigating torsional vibrations about a Z-axis of a lift truck, the lift truck including a mast, the method comprising:

measuring yaw about the Z-axis at or near a top of the mast; and inducing a counter moment at or near a mast fixed base with a corrective yaw input mechanism when the measured yaw about the Z-axis at or near the top of the mast exceeds a predetermined value, the counter moment to damp the measured yaw about the Z-axis at or near the top of the mast.

14. The method according to claim 13:

wherein the corrective yaw input mechanism comprises a steering wheel and a controller; and further comprising the steps of:

providing a steering input to the steering wheel from the controller;

adjusting a steering angle without input from a lift truck operator; and the steering input from the controller inducing the counter moment to damp the measured yaw about the Z-axis at or near the top of the mast.

15. The method according to claim 13:

wherein the corrective yaw input mechanism comprises an actuator coupled to a motor carriage; and further comprising the steps of:

extending the actuator from a first position to an extended position, the actuator extending a tractor frame from a first tractor frame position to a second tractor frame position, thereby creating the counter moment and damping torsional vibrations at or near the top of the mast.

16. The method according to claim 13:

wherein the corrective yaw input mechanism comprises a load wheel including a brake; and further comprising the steps of:

applying the brake to create the counter moment and damping torsional vibrations at or near the top of the mast.

17. A method for mitigating vibrations in a lift truck, the method comprising:

monitoring at least one of operator inputs and lift truck parameters;

determining if a steering angle is substantially constant;

measuring torsional vibrations about the Z-axis in the lift truck;

determining if the measured torsional vibrations are at or over a predefined limit; and instructing a corrective yaw input mechanism to generate a corrective yaw input at or near a base of the lift truck, the corrective yaw input for reducing the measured torsional vibrations.

18. The method according to claim 17:

wherein determining if the measured torsional vibrations are at or over a predefined limit includes determining if the measured torsional vibrations are increasing or decreasing.

* * * * *